United States Patent [19]

Henderson, Jr.

[11] Patent Number: 4,628,478

[45] Date of Patent: Dec. 9, 1986

[54] REMOTE DATA CONTROLLER FOR A COMMUNICATION SYSTEM

[75] Inventor: James A. Henderson, Jr., Streamwood, Ill.

[73] Assignee: Motorola, Inc., Schaumburg, Ill.

[21] Appl. No.: 511,611

[22] Filed: Jul. 7, 1983

[51] Int. Cl.$^4$ .................... G06F 13/00; G06F 11/00
[52] U.S. Cl. .................................. 364/900; 364/132; 364/138; 340/825.07
[58] Field of Search ... 364/200 MS File, 900 MS File, 364/188, 189, 132, 137, 138, 144; 340/825.52, 825.54, 825.72, 825.07, 825.06, 825.17

[56] References Cited

U.S. PATENT DOCUMENTS

| | | | |
|---|---|---|---|
| 3,643,217 | 2/1972 | Morphew et al. | 340/147 P |
| 3,715,725 | 2/1973 | Kievit et al. | 364/200 |
| 3,883,855 | 5/1975 | Brightman et al. | 340/172.5 |
| 3,985,217 | 8/1975 | Kortenhaus et al. | 194/15 |
| 4,015,243 | 3/1977 | Kurpanek et al. | 364/200 |
| 4,024,505 | 5/1977 | Sperling | 364/200 |
| 4,047,244 | 9/1977 | Finkemeyer et al. | 364/200 |
| 4,050,095 | 9/1977 | Pettipher et al. | 364/200 |
| 4,059,736 | 11/1977 | Perucca et al. | 179/175.2 |
| 4,118,772 | 10/1978 | Takada | 364/188 X |
| 4,189,765 | 2/1980 | Kotalik et al. | 364/188 |
| 4,249,240 | 2/1981 | Barnich | 364/200 |
| 4,298,860 | 11/1981 | Norberg et al. | 340/825.04 |
| 4,424,559 | 1/1984 | Lorincz et al. | 364/189 X |
| 4,425,616 | 1/1984 | Woodell | 364/200 |
| 4,429,299 | 1/1984 | Kabat et al. | 340/310 R |
| 4,475,176 | 10/1984 | Ishii | 364/900 |

FOREIGN PATENT DOCUMENTS

| | | | |
|---|---|---|---|
| 55-102990 | 8/1980 | Japan | 340/825.07 |
| 58-70696 | 4/1983 | Japan | 340/825.07 |

OTHER PUBLICATIONS

Motorola Instruction Manual 68P81033E55-O for Utility Demand Controller Model Q1801A, pp. 1-13 and p. 15, and the Diagram pertaining to the Utility Demand Controller Model.

Primary Examiner—James D. Thomas
Assistant Examiner—Thomas C. Lee
Attorney, Agent, or Firm—Charles L. Warren; Donald B. Southard; Edward M. Roney

[57] ABSTRACT

The communications system may include wireless two-way communications equipment having selectable functions and various operational features. Control modules each include mechanisms for providing indicia representative of the status of the features of the communications equipment and mechanisms for generating data for controlling the functions to be selected on the communications equipment. A group of the control modules are coupled to a panel module which selectively communicates with each of the control modules in the group. An interface circuit is coupled to a plurality of the panel modules for selectively communicating with each; the interface circuit includes a microprocessor for writing indicia data to each of the selected control modules via the selected panel module and reads the control data generated by the control modules. The periodic scanning and reading of information is utilized to ascertain changes in the data.

9 Claims, 7 Drawing Figures

REMOTE DATA CONTROLLER FOR A COMMUNICATION SYSTEM

BACKGROUND OF THE INVENTION

This invention relates generally to a communication system in which various operator control information is input and various status information is output to provide information to the operator. The present invention relates more specifically to a data control apparatus wherein operator generated control information is processed and transmitted as control data to the communications system and which receives output data from the system and processes same to provide the operator with status information.

The communications system may include a plurality of two-way radio base stations used to provide wireless communications with other remotely located base stations, mobile radios or portable units. Each base station has certain functions which must be controlled, such as transmitter keying, transmitter and receiver frequency selection, audio path routing and tone signalling information. Similarly, the control operator or operators must be provided with information relating to the status of the various functions of each base station such as which stations are busy, the frequency selected, etc., in order to effectuate and efficiently contol the operation of the communications system.

It is know to provide separate wire lines between the base stations and an operator controlled apparatus for each separate base station function. However, the cost, maintenance, and complexity associated with controlling more than a few base stations in this manner make this approach undesirable. Furthermore, adding additional base stations after the initial installation requires that additional control lines be installed.

SUMMARY OF THE INVENTION

It is an object of the present invention to provide an improved data control apparatus for a communication system capable of providing control data to the system and receiving status data from the system over a minimum of control lines.

A further object of this invention is to provide a microprocessor controlled operator interface apparatus for minimizing the number of lines required to communicate operator generated data and operator received data.

Another object of the present invention is to provide a microprocessor controlled operator interface apparatus capable of accepting additional communications equipment without requiring operational changes.

A more specific object of the invention is to provide selectively addressable operator controlled modules for providing status indicia and for receiving operator input data.

A further object of the present invention is to provide a plurality of control panels each adapted to be separately addressed and each capable of receiving a predetermined number of control modules.

A still further object of the invention is to minimize the number of lines required to carry input and output data between the control panels and the interface apparatus.

The present invention is specifically, although not exclusively, suited for use in a communication system having a plurality of base stations and a communication equipment controller in two-way communication with the base stations. The controller is also in two-way data communication with a data interface system which is in communication with a plurality of control panels each having a plurality of operator control modules. The data interface system addresses each control panel and also addresses each of the control modules associated with each panel to provide each control module with status data and to receive from each control module operator control data. The number of communication lines between the data interface system and the control modules are minimized by using complementary parallel-to-serial converting means on the control modules and serial-to-parallel converting means on the data interface system whereby serial data is transmitted between same.

Each operator control module may contain a number of switches for providing input control information, visual display devices for indicating the status of selected communications equipment features, and means for providing an analog control voltage for controlling a communication equipment function. An analog to digital converter converts the analog voltage into a digital format which is transmitted in serial form by a parallel-to-serial converting means to the data interface system. The switch information signals are likewise converted from a parallel to serial format, and transmitted to the data interface system. Operator status information is sent serially from the data interface system to the respective control modules where it is stored in a shift register for controlling visual indicia.

BRIEF DESCRIPTION OF THE DRAWINGS

In the drawings which illustrate an embodiment of the present invention, the same reference numbers represent like elements in the different figures.

DETAILED DESCRIPTION

Figure 1:
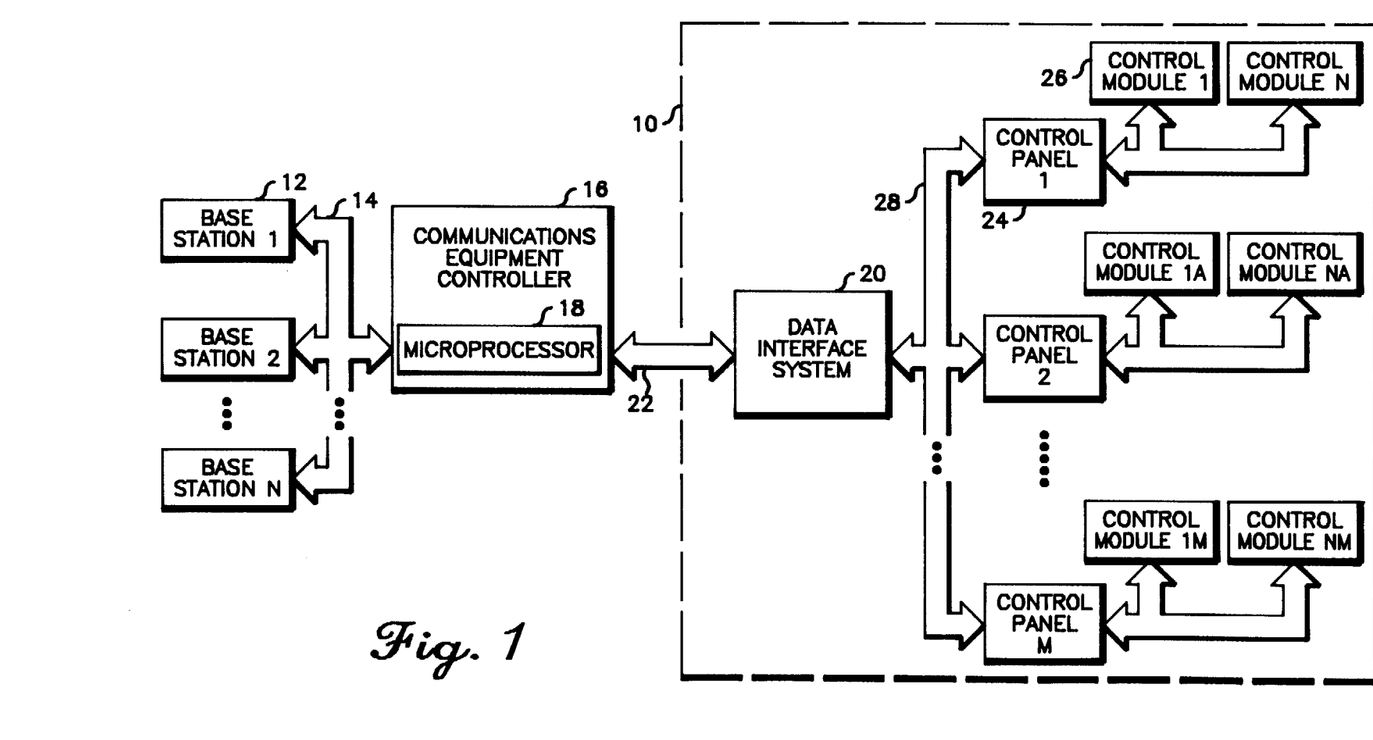
FIG. 1 is a block diagram representation of an embodiment of the present invention as utilized in a communications system.

In FIG. 1, an embodiment of a data controller 10 according to the present invention is advantageously utilized in a communications system. In the exemplary communications system, a plurality of base stations 12 are connected by wire paths 14 to a communications equipment controller 16 which may include microprocessor 18. Each base station has a plurality of selectable functions. The communications equipment controller 16 selects the features to be activated on each base station and provides base station status information to data controller 10.

The data controller 10 includes a data interface system 20 which receives the status information from equipment controller 16 and provides feature selection data to the communications equipment controller 16 via communication lines 22. The data interface system 20 selectively communicates with control panels 24 each of which has associated therewith a plurality of control modules 26. Each control module contains means for conveying the status of the various equipment functions to the operator and has means for generating data for controlling the activation of the selectable base station functions. The data interface system 20 periodically scans each control panel and its associated control modules to receive feature selection data and output status information to the modules. The data interface system, control panels, and control modules cooperate to minimize the number of lines 28 needed for communication between the control panels and the data interface system.

Figure 2:
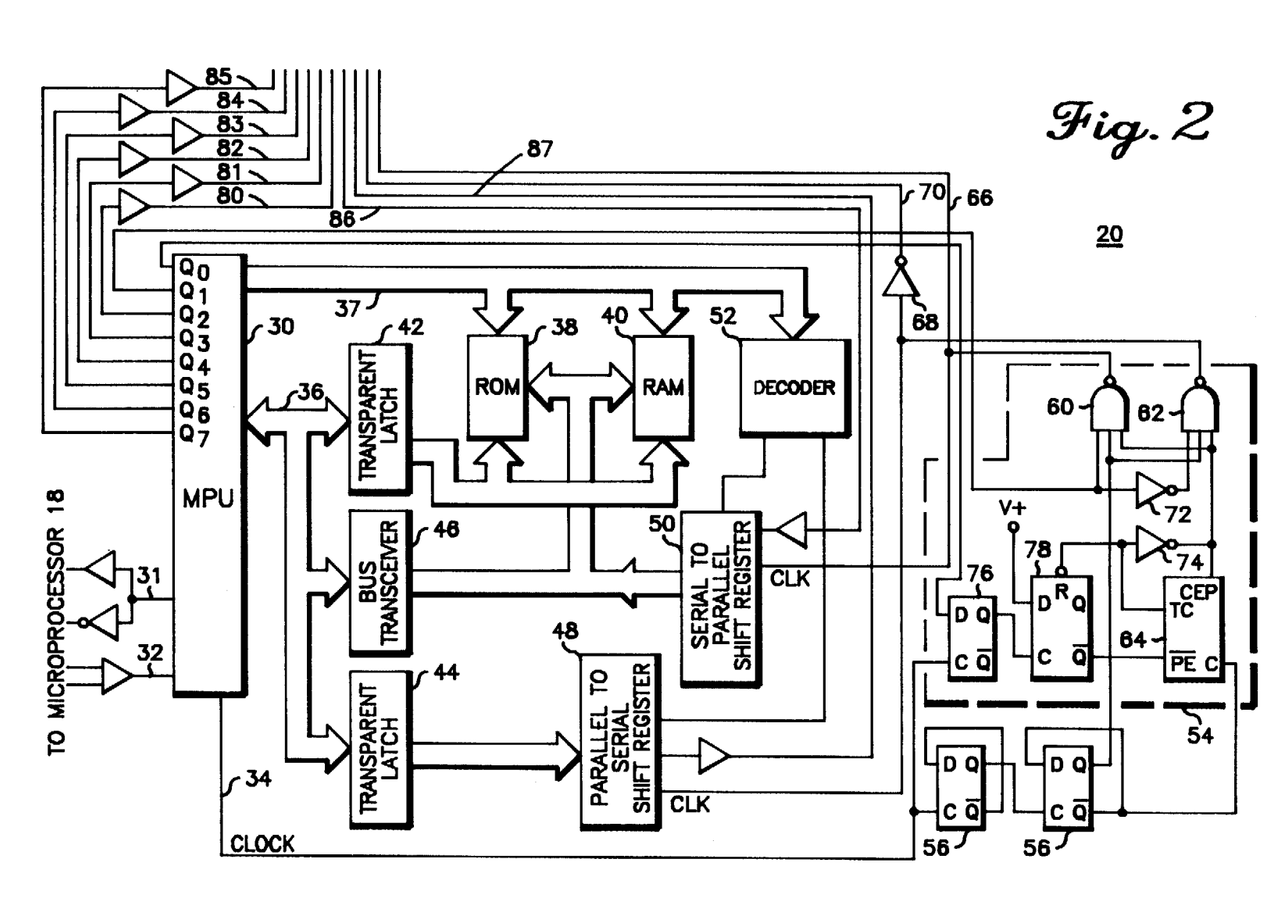
FIG. 2 is a detailed block diagram of the data interface system shown generally in FIG. 1.

FIG. 2 illustrates the data interface system 20 in specific block diagram form. A microprocessor 30 such a an MC6803 includes latched outputs Q0–Q7, data output 31 and data input 32 adapted to communicate with the communications controller microprocessor 18, a clock output 34, and address/data buses 36, 37. This microprocessor has access to external memory in the form of read only memory (ROM) 38 and random access memory (RAM) 40. Additional peripheral support is provided for microprocessor 30 by transparent latches 42, 44 which may consist of a 74LS573 and a bus transceiver 46 which may consist of a 74LS245. These peripherals are utlized to latch address and data words facilitating the operation of the microprocessor. A parallel-to-serial shift register 48 such as a 74LS165 accepts parallel data from the microprocessor which is to be later sent in serial format to the control panels. A serial-to-parallel shift register 50 such as a 74LS299 accepts serial data from the control panel and permits the microprocessor to read this data as a parallel word. A decoder 52 which may consist of a 74LS138 functions as a selector controlled by the microprocessor to select one of the shift registers 48 and 50.

A clock generator 54 provides output clock signals to shift registers 48, 50 and to the control panels 24 and control modules 26. The outputs of this clock are used to write data from shift register 48, read data into shift register 50, and cause the complementary transfer of data to and from shift registers located on the control module as will be explained below. The clock generator 54 once enabled by microprocessor 30 generates 8 clock pulses. This generator is self-completing, i.e. once initiated, the 8 clock pulses will be generated even if the microprocessor 30 should be interupted or other events occur. This assures the completion of the transfer of data being clocked without interruption.

In the operation of clock generator 54, type D flip-flops 56 and 58 function to divide the output clock 34 from microprocessor 30 by 4. The Q output of flip-flop 58 is an input of both NAND GATES 60 and 62, and $\overline{Q}$ output provides the clock input into a 4 bit counter 64 such as a 74LS161. The NAND gates 60 and 62 function as control gates to permit the Q output of flip-flop 58 to pass through a selected one of gates 60 and 62.

The output of gate 60, when enabled, provides a clock input to shift register 50 and other shift registers located on the control panels and control modules via line 66. When gate 62 is enabled, its output provides a clock to shift register 48 and after being inverted by inverter 68 provides an inverted clock signal on line 70 to shift registers located on the control modules.

In more detail, clock generator 54 is activated to provide clock outputs via gate 60 to shift register 50 when microprocessor 30 writes a high (1) on latched output lines Q0 and Q1. The high on Q1 enables the connected input on NAND gate 60 and inhibits NAND gate 62 by the input provided from inverter 72. The other control input of NAND gates 60 and 62 is provided by the TC output of counter 64 through inverter 74. When counter 64 is enabled to count, the inverted TC output of this counter provides enable inputs to NAND gates 60 and 62. Thus, counter 64 either releases the NAND gates 60 and 62 to be selectively enabled according to the Q1 output from the microprocessor or inhibits both of the gates preventing any output clock signals.

The Q0 output from the microprocessor is connected to the D input of flip-flop 76 and will be clocked to the Q output of this flip-flop on the next clock on clock output line 34. When the Q output of flip-flop 76 goes high it clocks flip-flop 78 such that its $\overline{Q}$ output will go low (0) causing the preload enable ($\overline{PE}$) input of counter 64 to preload the counter with a number 7 on the next clock input to this counter. The preloading of the counter causes its TC output to go low which resets flip-flop 78 thereby removing the low on the preload enable input to the counter. The low on TC is inverted by inverter 74 thereby permitting the NAND gates 60 and 62 to be enabled. The high on the Q1 output of the microprocessor enables NAND gate 60 and inhibits gate 62. Thus, NAND gate 60 will pass clock signals from the Q output of flip-flop 58. When 8 clock cycles have occurred, counter 64 will have reached a count of 15 causing its TC output to go high which is inverted by inverter 74 to inhibit both NAND gates 60 and 62. In this manner, clock generator 54 generates self-completing clock cycles. The operation of the clock generator to generate clock outputs from NAND gate 62 occurs in the same manner except the Q1 output from microprocessor 30 writes a low instead of a high thereby enabling NAND gate 62 and inhibiting NAND gate 60.

Communication lines between the data interface system 20 and the control panels consist of latched Q2–Q7 outputs from microprocessor 30 which are carried by buffered lines 80–85, respectively, data input line 86 which carries data from shift register 50, data output line 87 which carries data from shift register 48, and clock lines 66 and 70 which carry the selectively enabled clock outputs from clock generator 54.

Figure 3:
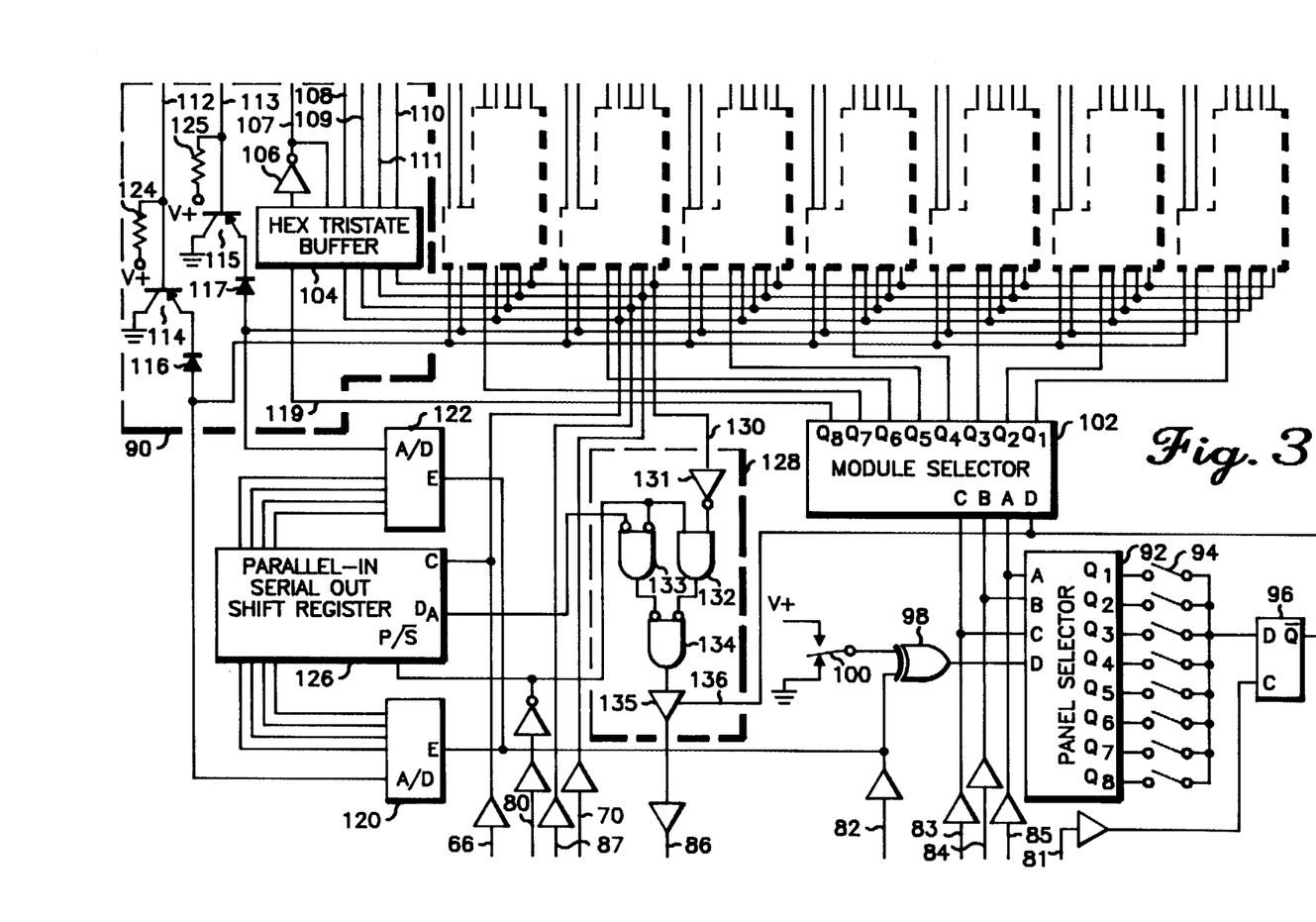
FIG. 3 is a detailed block diagram of a representative control panel as shown in FIG. 1.

FIG. 3 illustrates an exemplary control panel 24 having input and output lines communicating with the data interface system 20 disposed along the bottom edge of the drawing and having a plurality of multiplex networks 90 for selectively communicating input and output information between the control panel 24 and a plurality of control modules 26. The corresponding input and output lines of each of the M number of control panels are connected in parallel to the data interface system 20.

Each control panel has a separate address which is determined by a panel selector 92 which may consist of a BCD to decimal decoder such as a 4028. One of the Q1–Q8 outputs of the panel selector 92 is selected by means of switches 94 each of which are connected to the D input to flip-flop 96. A 4 bit panel address BCD word is written on lines 82–85 by the microprocessor 30. The output on line 82, which is the most significant bit, is coupled by means of an exclusive OR gate (EXOR) 98 which functions as a non-inverting buffer if switch 100 connects its other input to a low as shown and functions as an inverter if switch 100 provides a high input.

A maximum of 16 panels may be addressed in this manner. The first 8 panels are addressed by selecting different outputs Q1–Q8 on selector 92 by means of switches 94 and setting switch 100 to a low thereby causing EXOR gate 98 to function as a buffer. Panels 9–16 are addressed by selecting different outputs Q1–Q8 on each selector 92 and by setting switch 100 on each of these panels to provide a high input causing EXOR gate 98 to function as an inverter. The inverting of the most significant bit of the 4 bit BCD address to panels 9–16 permits 16 different panel addresses to be generated although only 8 selectable output states of the panel selectors are utilized.

After the appropriate address is written by the microprocessor to the panel selectors, the microprocessor generates a clock on line 81 to flip-flop 96. The $\overline{Q}$ output of flip-flop 96 for the selected control panel is clocked from a high to a low since the D input will be a high for the selected panel. The $\overline{Q}$ output of flip-flops 96 for nonselected control panels will remain a high since the D inputs will remain a low. The state of flip-flop 96 serves to either enable the selection of a control module associated with the selected control panel or inhibits all control modules associated with nonselected control panels as will be explained below. Microprocessor 30 does not generate another clock signal on line 81 until another control panel is to be addressed.

A module selector 102 which may consist of the same BCD to decimal decoder as panel selector 92 provides a means for selecting one of a maximum of 8 control modules 26 associated with each control panel 24. Except for the most significant bit input D which is connected to the $\overline{Q}$ output or flip-flop 96, the other BCD inputs are connected in parallel with corresponding inputs to panel selector 92. After the panel selection has occurred, the microprocessor 30 writes a new address on the common input lines 83–85 wherein module selector 102, if enabled, decodes this information to enable one of its outputs Q1–Q8. When the D input to a module selector 102 is a high indicating that the corresponding panel has not been selected, this module selector 102 is effectively inhibited since it is impossible to input a BCD number less than 8; thus, none of the 8 module selector outputs which correspond to BCD numbers 0–7 can be enabled. On the selected control panel, the D input to the corresponding module selector 102 is a low thereby enabling the microprocessor to address one of the 8 control modules by writing a new address on lines 83–85. The sharing of common address lines by the control panel and module contributes to minimizing the number of communication lines needed between the data interface system 20 and control panels 24.

A multiplex network 90 for each of the eight possible control modules 26 permits the flow of information between each selected module and microprocessor 30 by means of common bus lines 66, 80, 87, 70 and 86. Assuming that the control module corresponding to the Q8 output of module selector 102 has been selected, the high output on Q8 is connected to one input of one of the buffers in a hex tristate buffer 104 whose output is connected to inverter 106 having an output 107 which is connected to the tristate control for the four buffers used to buffer lines 108–111 which provide connections to the selected control module. The buffers 104 in the other multiplex networks 90 corresponding to control modules which are not selected are disabled thereby preventing loading of the shared bus lines.

Analog voltage information from the selected control module 26 is coupled to the control panel by means of lines 112 and 113. Transistors 114, 115 function as emitter followers to couple the analog voltage information via isolation diodes 116, 117 and lines 118 and 119 to 4 bit analog to digital converters 120 and 122, respectively. In the multiplex networks 90 corresponding to control modules which are not selected, resistors 124, 125 bias the corresponding transistors 114, 115 off permitting the corresponding isolation diodes 116, 117 to isolate the not selected control modules from the shared bus lines, 118, 119.

The analog to digital converters 120 and 122 are enabled by means of line 82 from microprocessor 30. The 4 bit output word from each of converters 120 and 122 is loaded into parallel-in/serial-out shift register 126 which may consist of a 4021. To transfer the digitized analog voltage information, the microprocessor writes a high on line 80 causing register 126 to parallel load an 8 bit word consisting of the two 4 bit outputs of analog to digital converters 120 and 122. The microprocessor 30 then initiates the clock generator 54 which applies clock signals via line 66 to register 126 causing its data to be serially shifted out its output line DA. The signal applied on line 80 in addition to loading shift register 126 is applied to a data selector 128 enabling same to pass the serially shifted output data from the DA output of register 126 to the microprocessor via line 86.

The function of data selector 128 is to route data from register 126 or switch data on line 130 to the microprocessor 30 via line 86. The data selector consists of an inverter 131, an AND gate 132, NOR gates 133, 134 and tristate buffer 135. It will be apparent that data selector 128 is disabled, i.e. permits no data to pass for control panels not selected, by means of the control line 136 for tristate buffer 135 which is connected to the $\overline{Q}$ output of flip-flop 96. The signal coupled by line 80 to NOR gate 133 and AND gate 132 enables one of these gates and disables the other. Thus, either the data from shift register 126 or the data on line 130 can be selected.

Figure 4:
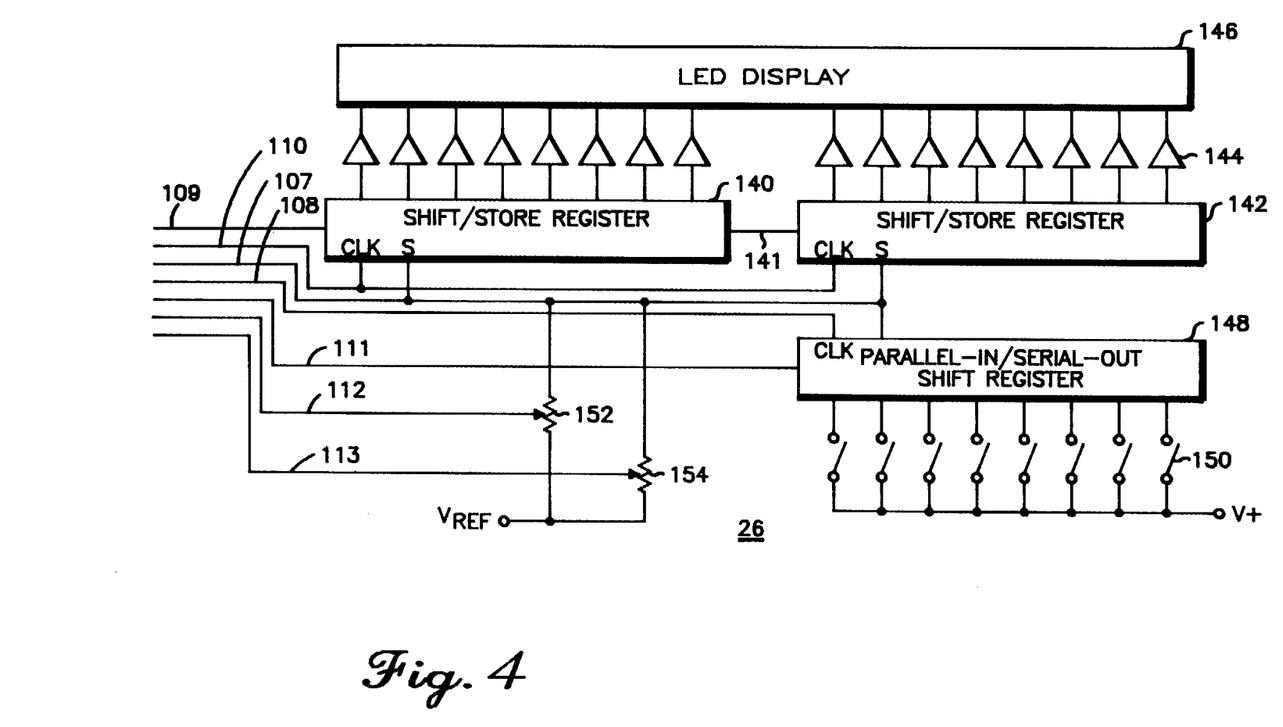
FIG. 4 is a detailed blocked diagram of a representative control module as shown in FIG. 1.

FIG. 4 illustrates an embodiment of a control module 26 which communicates with the control panel 24 by means of lines 107–113. Status data corresponding to the status of the communications equipment is shifted into and stored in registers 140, 142 which may each comprise a 4094. The outputs of these registers are connected to buffers 144 which may drive display 146 which may consist of individual light emitting diodes (LED). Each LED may be associated with the status of a predetermined communications equipment function. Of course, other types of indicia could be used to convey the status information.

A parallel-in/serial-out shift register 148 such as a 4021 is utilized to originate an 8 bit data word representative the state of the 8 manually operatable switches 150 which may be used by the control operator to control the functions of the communications equipment. Potentiometers 152 and 154 are manually operable by the control operator to generate corresponding analog voltages on lines 112 and 113 to the control panel which converts same into digitized information which can be processed by the microprocessor 30 to effectuate control of the communications equipment. For example, the analog voltage could represent a control signal determinative of the magnitude of an audio signal which is fed to a speaker located at the operator control site.

The strobe inputs (S) of registers 140 and 142 are held low by means of line 107 while the control module is selected. This permits data to be shifted into the register via line 109 without effecting its outputs to buffers 144. The microprocessor 30 writes an 8 bit word into register 48 and initiates clock generator 54 which generates 8 clock cycles on line 70 which is coupled to registers 48, 140 and 142. This causes the data to be serially shifted from register 48 into register 140. The microprocessor 30 then writes a second 8 bit word to register 48, again initiates clock generator 54 and serially transfers the second data word from register 48 to register 140 which simultaneously transfers the first data word to register 142 via line 141. Thus, LED display information has been loaded into registers 140 and 142 although the output of these registers have not been allowed to change because of the strobe input on line 107. When the microprocessor releases this control module and selects another control module, line 107 will become a high releasing the strobe input to registers 140, 142. The new information stored in the register will be transferred to their respective outputs causing an update in the status information as displayed by the LED display.

Operator control data as determined by the state of switches 150 are shifted in parallel into register 148 when the control module is selected by means of line 107. To read this information, microprocesor 30 initiates clock generator 54 to output 8 clock cycles on line 66 which provides a clock input on line 108 to register 148. The previously entered switch data is then serially shifted out of register 148 on line 111 and via line 130 thru data selector 128 onto line 86 and is serially shifted into shift register 50 which concurrently receives clocks on line 66. The microprocessor 30 can now read the data contained in register 50 as an 8 bit parallel input word by means of bus transceiver 46.

Analog voltage information from potentiometers 152, 154 occurs only when line 107 goes low on the selection of the control module thereby causing a proportional voltage to be developed at the wiper arm of each potentiometer. This analog information is converted into two 4 bit words stored in shift register 126 on the control panel as previously described. To read this data, microprocessor 30 initiates clock generator 54 to output 8 clock cycles on line 66 to register 126 causing it to serially output the digitized analog data via selector 128 and line 86 into shift register 50. The microprocessor then can read words stored in register 50 in parallel by means of bus transceiver 46.

Microprocessor 30 receives equipment (base station) status information on line 32 from microprocessor 18 in the communications equipment controller 16 which determines the on/off status of each corresponding LED in the display. The microprocessor 30 transmits via line 31 to microprocessor 18 operator selected control information consisting of switch data determined by switches 150 and a digitized form of analog inputs as determined by potentiometers 152 and 154. In a typical application, the switch information may be utilized to control the keying of the base stations 12, select the transmit frequency of the base stations, determine any tone signaling to be generated, and control other functions under the control of an operator. The status information indicated by the LED's provide indicia informing the control operator(s) of varios conditions such as which transmitter is keyed, its frequency of operation, tone signalling being utilized, audio connection paths, channel availability, and other conditions useful to the operator in the control of the communications equipment.

Figure 5:
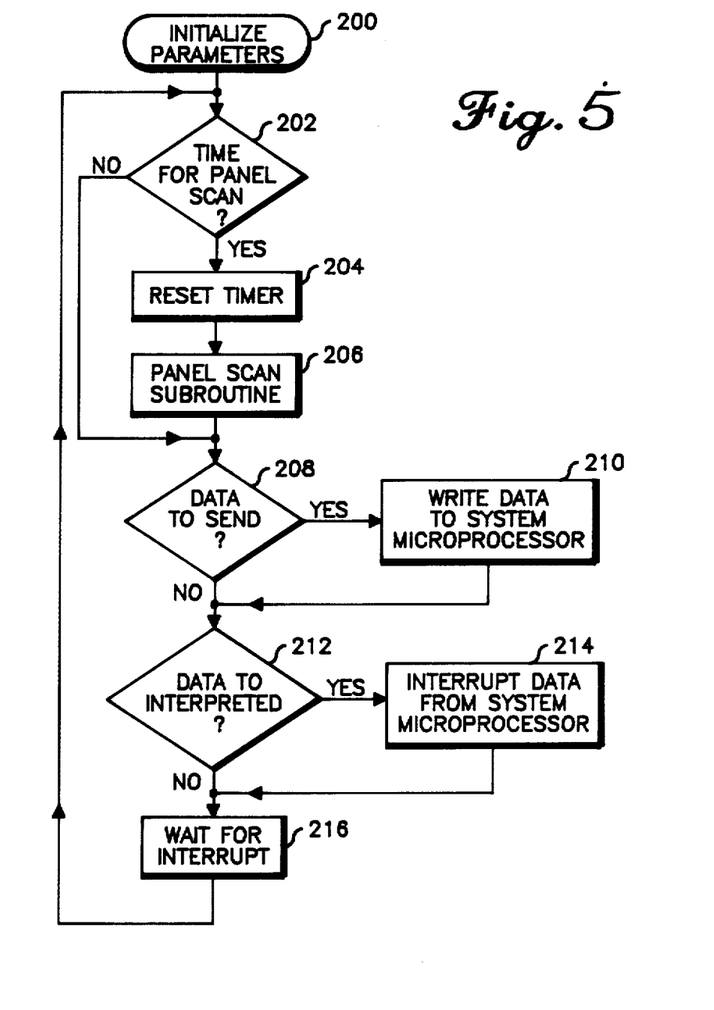
FIG. 5 is a flow chart illustrating the control program of the microprocessor controlled data interface system.

FIG. 5 illustrates a flow chart for a control program for microprocessor 30. When power is first applied, the microprocessor executes an initialization routine represented by initialized block 200 and initializes the stack pointer, initializes data storage locations, presets the I/O ports, and presets internal counters. As represented by decision block 202, a decision is made as to whether it is time for a control panel scan, that is, should the microprocessor begin scanning each panel and each control module on each panel by reading and writing data to each control module. An internal time based counter in the microprocessor is utilized to determine when another periodic panel scan should be initiated following the last panel scan that occurred. When the decision is yes, program block 204 resets this timer and passes control to the panel scan subroutine block 206. This subroutine controls the reading and writing of all information to and from the control module and the sequential selection of control panels and control modules. The panel scan subroutine is shown in more detail in FIG. 6 and is explained more fully below.

Following the completion of the panel scan subroutine block 206 or in the event that the decision block 202 relating to a time for panel scan was negative, control passes to decision block 208 where the microprocessor makes a decision as to whether to send data to the system microprocessor 18. The decision will be yes if new or changed control data has been received by the microprocessor. As indicated by block 210 any new control data is then written by microprocessor 30 to the system microprocessor 18. Control then passes to decision block 212 wherein a decision is made concerning the interpretation of data received from microprocessor 18. If data has been received, then the decision is yes and block 214 indicates that microprocessor 30 interprets such data. Control then passes to an interrupt block 216 wherein microprocessor 30 waits for either an interrupt to perform a priority task or waits for the internal timer referenced in block 204 to be reset thereby transferring control back to the decision block 202. Thus, it will be apparent that microprocessor 30 functions as a data interface which controls the accumulation of input data from control panels and transfers output data to the controls panels.

Figure 6:
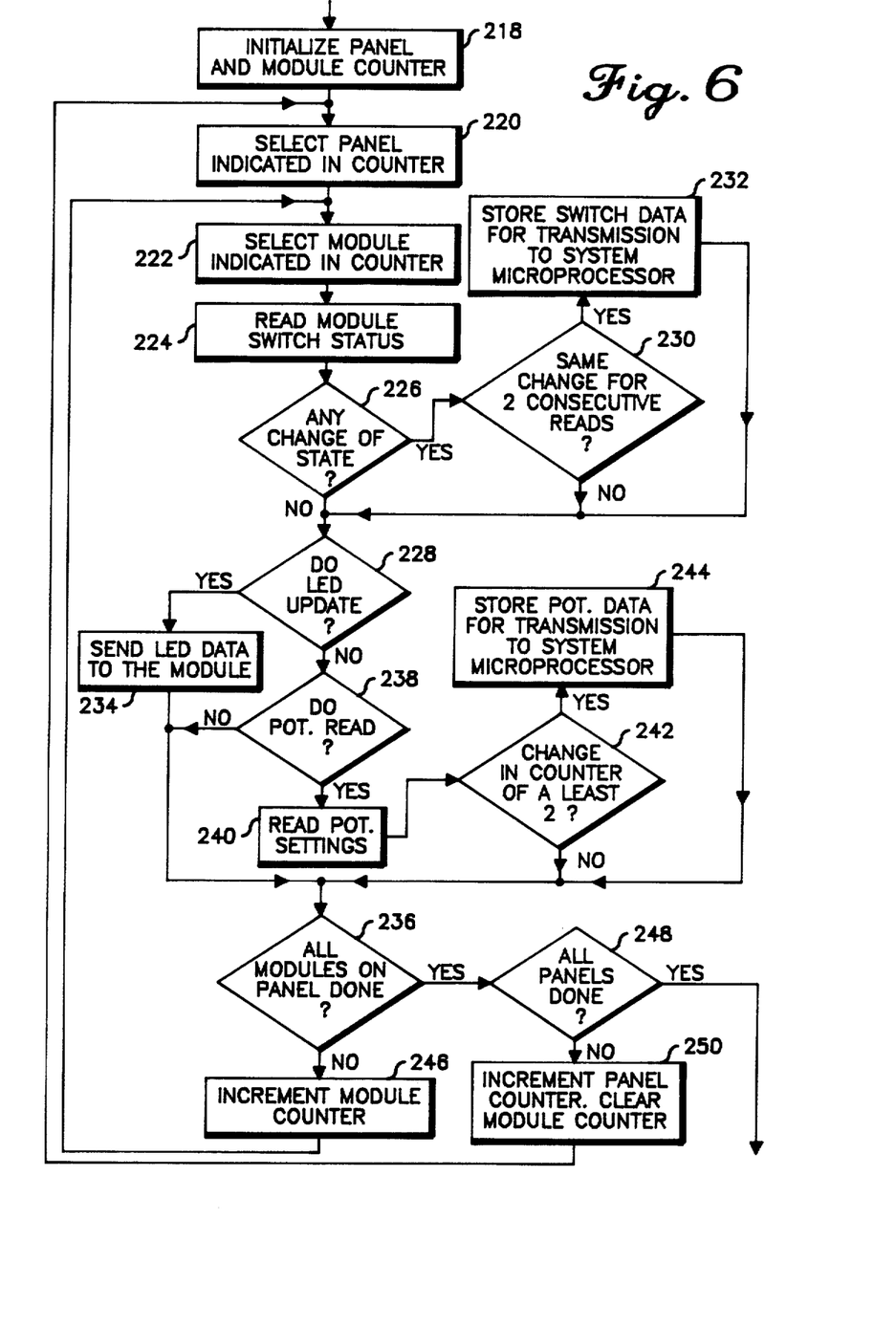
FIG. 6 is a flow chart illustrating the panel scan subroutine as shown in FIG. 5.

FIG. 6 illustrates a flow chart showing the panel scan subroutine 206 of FIG. 5 in more detail. As indicated in block 218 the panel scan subroutine starts by initializing separate panel and module counters internal to microprocessor 30 which are used for determining the state of the scaning of the panels and modules. Preferably the panel and module counters are enabled to count to a maximum number of M and N, respectively, regardless of the actual number of control panels and control modules employed.

In accordance with block 220, the particular panel as determined by the count in the panel counter is selected for further scaning, that is, reading and writing of data. Similarly block 222 selects the particular control module associated with the control panel being scanned in accordance with the count contained in the module counter. Next as shown in block 224, the switch data corresponding to the status of switches 150 in the selected control module is read by the microprocessor.

Decision block 226 determines if any of the switch data for this control module has changed since the last reading of the switch data. If there is no change, control passes to decision block 228. If the switch data has changed, control passes to a "debounce" subroutine starting with decision block 230 wherein a determination is made if the change in switch data relative to stored previously read data has remained the same for two consective data readings. If yes, a stable intentional change is deemed to have occured; block 232 stores the new switch data for transmission to the system microprocessor 18. A no decision is made if two consecutive readings do not yield the same change in switch data when compared to the previously read data, i.e. the assumption is made that a reading error has occurred or that stable data is not present.

Control then passes to decision block 228 which determines whether an LED update should be made, that is, should new equipment status data be written to register 140 and 142. The decision is yes every other time a given control module is scanned and is no for the other scans. If yes, block 234 causes the microprocessor to send status data to the control module and returns control to decision block 236. If no, control passes to decision block 238 which determines whether to do a potentiometer (pot.) data reading. Every other time program control enters block 238 the decision will be yes; for the alternate occurences the desicion will be no. Thus the potentiometer digitized data is read only half as frequently as the LED's are updated which in turn is written half as frequently as the switch data is read.

A yes decision by block 238 causes the microprocessor to read the digitized analog data as indicated by block 240. Control then passes to decision block 242 which determines if a change of at least 2 in the BCD number has occurred since the last reading which is stored; hence this function acts as a data validation and debouncing function. If yes, the potentiometer data is stored for transmission to the system microprocessor and if no, control is returned to decision block 236. The decision block 236 determines if all modules on a given panel have been scanned, that is, has the internal module counter reached its maximum predetermined count N. If no, the module counter is incremented by block 246 and control is returned to block 222 to continue control module scanning. If yes, i.e. if all control modules have been scanned, control passes to decision block 248 which determines if all panels have been scanned, that is, has the internal panel counter reached its maximum predetermined count M. If no, the panel counter is incremented, the control module counter is reset, and control passes to block 220. If all panels have been scanned, the panel counter and the module counter are both reset since the panel scan subroutine 206 is complete; control passes to decision block 208 (see FIG. 5).

From the above description of the panel scan subroutine, it will be apparent that certain control module data is given priority with respect to other data. For example, the switch data which provides control information to the communications equipment is read each time the module is scanned by the microprocessor 30. LED status information is written by the microprocessor to the control module only every other time the module is scanned. The digitized analog data is read by the microprocessor only every fourth time the module is scanned. It will also be apparent from the above description that debouncing of the switch data and the digitized analog data is accomplished by the panel scan subroutine.

An advantageous feature of the operation of the present invention is that the maximum predetermined count for the panel and control module counters as used in the panel scan subroutine may be set to the maximum permissible number of control panels and control modules for each panel. With the illustrated embodiment, a maximum of 8 control modules may be utilized for each control panel and a maximum of 16 control panels can be addressed. Thus, the control panel counter can be enabled to count to 16 and the control module counter enabled to count to 8 even though fewer panels and modules may be actually utilized. It should be noted that the control program is independent of the actual number of panels and modules which are present, and therefore changes in the scanning and control steps are not required should fewer than the maximum number of same be utilized. Although nonexistent panels and/or modules may be scanned, the total scanning of all possible modules and panels occurs with sufficient speed such that this does not impose a constraint. This operation of the present invention is advantageous in that additional panels or modules may be added following the initial installation without any changes whatsoever in the functioning of the scanning and control steps. Thus, it is only necessary that additional apparatus be added to the existing apparatus in order for the system of the present invention to be expanded.

It should also be noted that the number of communications lines are between the data interface system 20 and control panels 24, and between the control panels and their respective control modules 26 have been held to a minimum. The sharing of common address selection lines to select control panels and modules, the use of common data buses, the use of multiplexing different data onto single lines, and the use of single lines to carry serial data as opposed to the many lines which would be required to carry parallel data contribute to this advantageous result.

Figure 7:
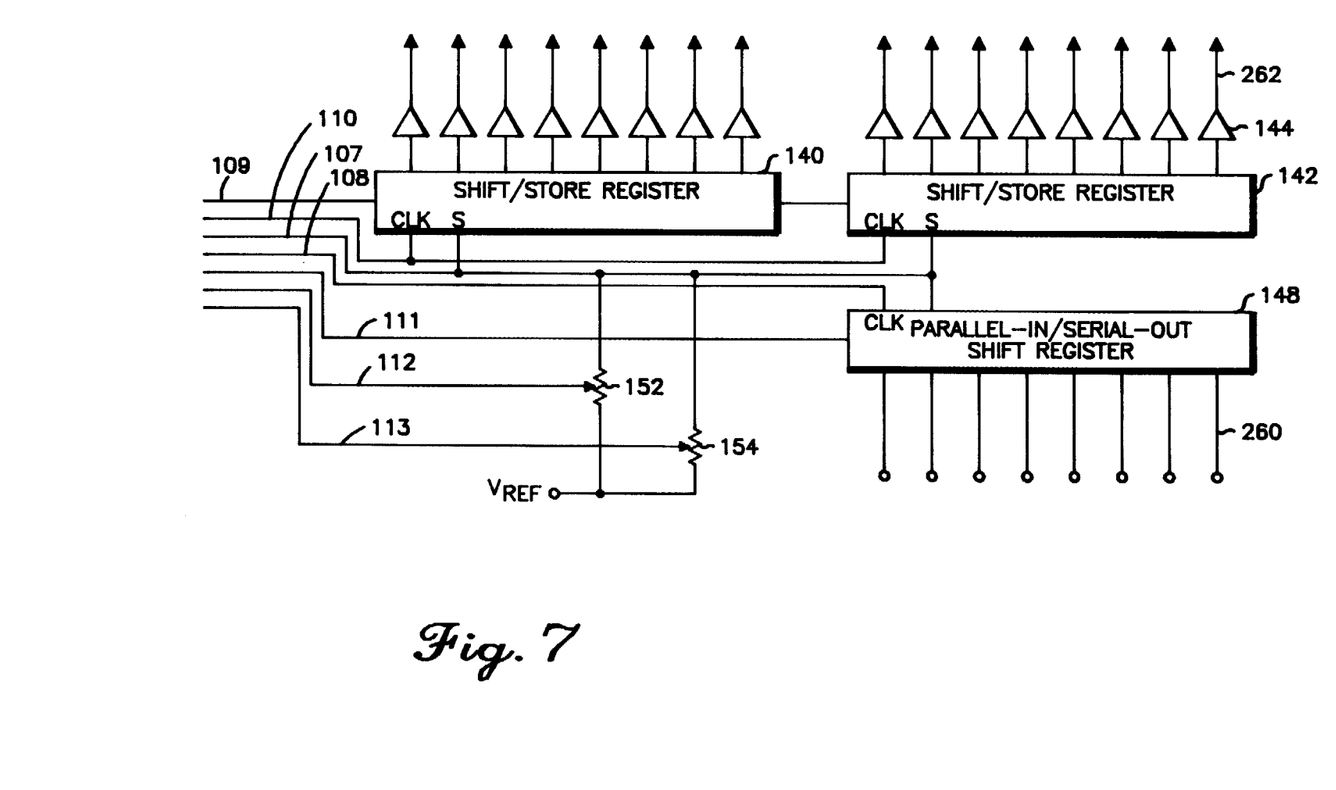
FIG. 7 is a block diagram of an alternative embodiment of a control module as shown in FIG. 1.

FIG. 7 shows an alternative embodiment of a control module which is substantially identical to the embodiment shown in FIG. 4 except that the parallel inputs to shift register 148 comprise data input lines 260 suitable for receiving an 8 bit data word representative of control information, and the output of buffers 144 consists of data output lines 262 which may be connected to provide input control data to external equipment. It will be apparent that the embodiment as shown in FIG. 7 can operate in an identical manner to that previously described with respect to FIG. 4. This embodiment of the control module demonstrates that the control modules may function as interface data terminals whereby data may be transferred between external equipment and microprocessor 30.

Although an embodiment of the present invention has been described and shown in the drawings, the scope in the present invention is defined by the claims appended hereto.

What is claimed is:

1. In a communications system including communications equipment having operator selectable functions and providing status signals representative of the operation condition of features of the communication equipment and means for controlling the communications equipment, the improvement in said controlling means comprising:

control modules each including means for receiving indicia data representative of the operational condition of the features of the communications equipment and providing indicia representative thereof, and means for generating data for controlling the functions selected on the communications equipment;

at least two control panel means each coupled to a predetermined plurality of said control modules for communicating digitally with each of said plurality, each of said control panel means including a panel selector having a predetermined address, and a module selector having a predetermined address for selecting one of the control modules associated with a control panel means;

data interface circuit means coupled between the communications equipment and each of said control panel means for communicating digitally with each of the control panel means, said data interface circuit means including a microprocessor means for selecting one of said panel means and one of its associated control modules via addressing the corresponding panel selector and module selector, writing indicia data representative of said status signal to the selected control module via the selected control panel means, and for reading said control data generated by said generating means as coupled by said control panel means; and means for selectively inverting the most significant bit in a binary number utilized to address said predetermined address of the panel selector after the generation of said binary number thereby defining a first range of addresses corresponding to the most significant bit not being inverted and a second range of addresses when the most significant bit is inverted.

2. The system according to claim 1 further comprising shift register means disposed in said control modules for receiving said indicia data in serial form from said microprocessor means.

3. The system according to claim 1 wherein said interface circuit means includes a shift register means for receiving said control data in serial form from said generating means and permitting said microprocessor means to read said control data from said shift register means in parallel form.

4. The system according to claim 1 wherein said interface circuit means can communicate with a maximum integer number M of control panel means and said control panel means can communicate with a maximum integer number N of control modules, said microprocessor means further comprising a means for scanning each of said M control panel means and each of the N control modules associated therewith, said scanning means causing said microprocessor means to write said indicia data and read said control data for each of the possible N control modules for each of the possible M control panel means even if fewer than the maximum number of control panel means and control modules are utilized, whereby additional control modules and control panel means can be added up to the maximum permissible number of each without altering the operational control of said microprocessor means.

5. The system according to claim 1 wherein said microprocessor means includes scanning means for periodically writing indicia data to and reading control data from each control module, means for storing said control data read from each of said control modules, means for comparing second and third control data values for a given control module with that of a first previously read control data value for the same control module, said microprocessor means effectuating a change in function in said communication equipment in response to said comparison means finding the difference between the second and first value to be the same as the difference between the third and first value, whereby a validation and debouncing function is accomplished by said microprocessor means.

6. The system according to claim 1 wherein said panel selector and said module selector share common address lines thereby minimizing the number of address lines required to address each control module and control panel means.

7. In a communications system including communications equipment having operator selectable functions and providing status signals representative of the operation condition of features of the communication equipment and means for controlling the communications equipment, the improvement in said controlling means comprising:

control modules each including means for receiving indicia data representative of the operational condition of the features of the communications equipment and providing indicia representative thereof, and means for generating data for controlling the functions selected on the communications equipment;

at least two control panel means each coupled to a predetermined plurality of said control modules for communicating digitally with each of said plurality, each of said control panel means including a panel selector having a predetermined address, and a module selector having a predetermined address for selecting one of the control modules associated with a control panel means;

data interface circuit means coupled between the communications equipment and each of said control panel means for communicating digitally with each of the control panel means, said data interface circuit means including a microprocessor means for selecting one of said panel means and one of its associated control modules via addressing the corresponding panel selector and module selector, writing indicia data representative of said status signal to the selected control module via the selected control panel means and for reading said control data generated by said generating means as coupled by said control panel means; and flip-flop means responsive to said panel selector being addressed for selectively inverting the most significant bit of the binary number used to address the module selector thereby defining a first range of addresses corresponding to the most significant bit not being inverted and a second range of addresses when the most significant bit is inverted.

8. The system according to claim 7 wherein said panel selector and said module selector share common address lines thereby minimizing the number of address lines required to address each control module and control panel means.

9. In a communications system including communications equipment having operator selectable functions and providing status signals representative of the operation condition of features of the communication equipment and means for controlling the communications equipment, the improvement in said controlling means comprising:

control modules each including means for receiving indicia data representative of the operational condition of the features of the communications equipment and providing indicia representative thereof, and means for generating data for controlling the functions selected on the communications equipment;

at least two control panel means each coupled to a predetermined plurality of said control modules for communicating digitally with each of said plurality, each of said control panel means including a panel selector having a predetermined address, and a module selector having a predetermined address for selecting one of the control modules associated with a control panel means;

data interface circuit means coupled between the communications equipment and each of said control panel means for communicating digitally with each of the control panel means, said data interface circuit means including a microprocessor means for selecting one of said panel means and one of its associated control modules via addressing the corresponding panel selector and module selector, writing indicia data representative of said status signal to the selected control module via the selected control panel means, and for reading said control data generated by said generating means as coupled by said control panel means; and data transfer circuit means for controlling the transfer of data from said control modules to said microprocessor means and for controlling the transfer of data from said microprocessor means to said control modules, said data transfer circuit means including a single clock means for generating clock pulses which are coupled to said control panel means and control modules, said clock means providing the sole source of clock pulses for the control panel means and control modules.

* * * * *